United States Patent

[11] 3,586,780

[72] Inventor Eiji Kezuka
Yokohama, Japan
[21] Appl. No. 839,439
[22] Filed July 7, 1969
[45] Patented June 22, 1971
[73] Assignee Matsushita Electric Industrial Co., Ltd.
Osaka, Japan
[32] Priority July 11, 1968
[33] Japan
[31] 43/49456

[54] AUTOMATIC TELEPHONE NUMBER INFORMATION SYSTEM
5 Claims, 8 Drawing Figs.

[52] U.S. Cl. .......... 179/6, 179/27
[51] Int. Cl. .......... H04m 3/50
[50] Field of Search .......... 179/6 CO, 27.24, 100.2 MI,S, 100.3 B,D

[56] References Cited
UNITED STATES PATENTS

| | | | |
|---|---|---|---|
| 2,968,700 | 1/1961 | Myers .......... | 179/27 |
| 3,300,591 | 1/1967 | Gushue et al. .......... | 179/100.3 |
| 3,412,215 | 11/1968 | Rawley .......... | 179/100.2 |
| 3,482,057 | 12/1969 | Abbott et al. .......... | 179/6 X |

*Primary Examiner*—Terrell W. Fears
*Assistant Examiner*—Raymond F. Cardillo, Jr.
*Attorney*—Stevens, Davis, Miller & Mosher

ABSTRACT: The present invention relates to a device for automatically informing a calling subscriber that the telephone number he wishes to contact has been changed; wherein when a subscriber is calling another subscriber and is unaware of the change, the calling subscriber is automatically informed of the changed or newly allotted number; wherein the setting and the modification of any individual number to be informed can be easily performed; and wherein the information of a plurality of changed or newly allotted numbers for many subscribers can be achieved through the use of a single device.

EIJI KEZUKA
INVENTOR

BY Stevens, Davis, Miller & Mosher
ATTORNEY

AUTOMATIC TELEPHONE NUMBER INFORMATION SYSTEM

The present invention aims at automatically informing a calling subscriber who is not yet aware that the number of the subscriber being called has been changed to another and one who is calling the old number, of the changed or newly allotted number; wherein as well the information of a plurality of changed or newly allotted numbers for many subscribers can be achieved through the use of a single device as the setting and modification of any individual number to be informed can be easily performed.

In the following the explanation of an embodiment according to the present invention will be made.

In the first place, the secondary equipment of the device according to the present invention, which will be mentioned in the later parts of this specification, is incorporated with the terminals of a line relay as line switch which is provided in a telephone exchange for every subscriber covered by the telephone exchange, and thereby when a ringing (a calling signal) from a calling subscriber is detected by said equipment, the signal is tripped to inform the calling subscriber of a newly allotted number. The present device comprises said secondary equipment, a number selection means and a recording system using a drum as a magnetic recording medium to store vocal information. The present invention will be better understood through reference to the description made hereafter in conjunction with the attached drawings, in which FIG. 1 shows an electrical circuit diagram of the secondary equipment of the device according to the present invention;

Figure 1:
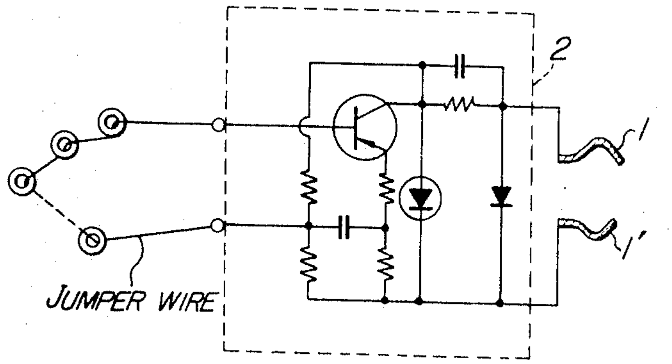

FIG. 1 shows the secondary equipment incorporated in one embodiment of the present invention, which comprises an amplifier circuit 2 adapted to amplify an output applied thereto via a pair of contacts 1 and 1′ which are connected with an arrester spring to break the connection of a line communicating between subscribers and further via a jumper wire which will be mentioned in the following.

In this case, the diode connected between the contacts 1, 1′ short circuits the contacts 1, 1′. The telephone exchange is not shown in the drawings. With a telephone exchange of a conventional type, a called subscriber is selected, when another subscriber is calling him, by means of the line relay or switch. When in this case the called subscriber is not busy, he receives a ringing signal from the exchange. The called subscriber recognizes the resulted ringing tone to answer the calling subscriber. According to the present invention, the ringing signal from such conventional exchange is rectified by means of the aforementioned diode to drive a relay (generally referred to as a power relay) connected to the ringing signal line of the exchange. The relay retains some of its contacts in self-holding condition until the speech channel (line) is intercepted by the calling subscriber, while the other contacts of the relay make other speech channel.

Figure 2:
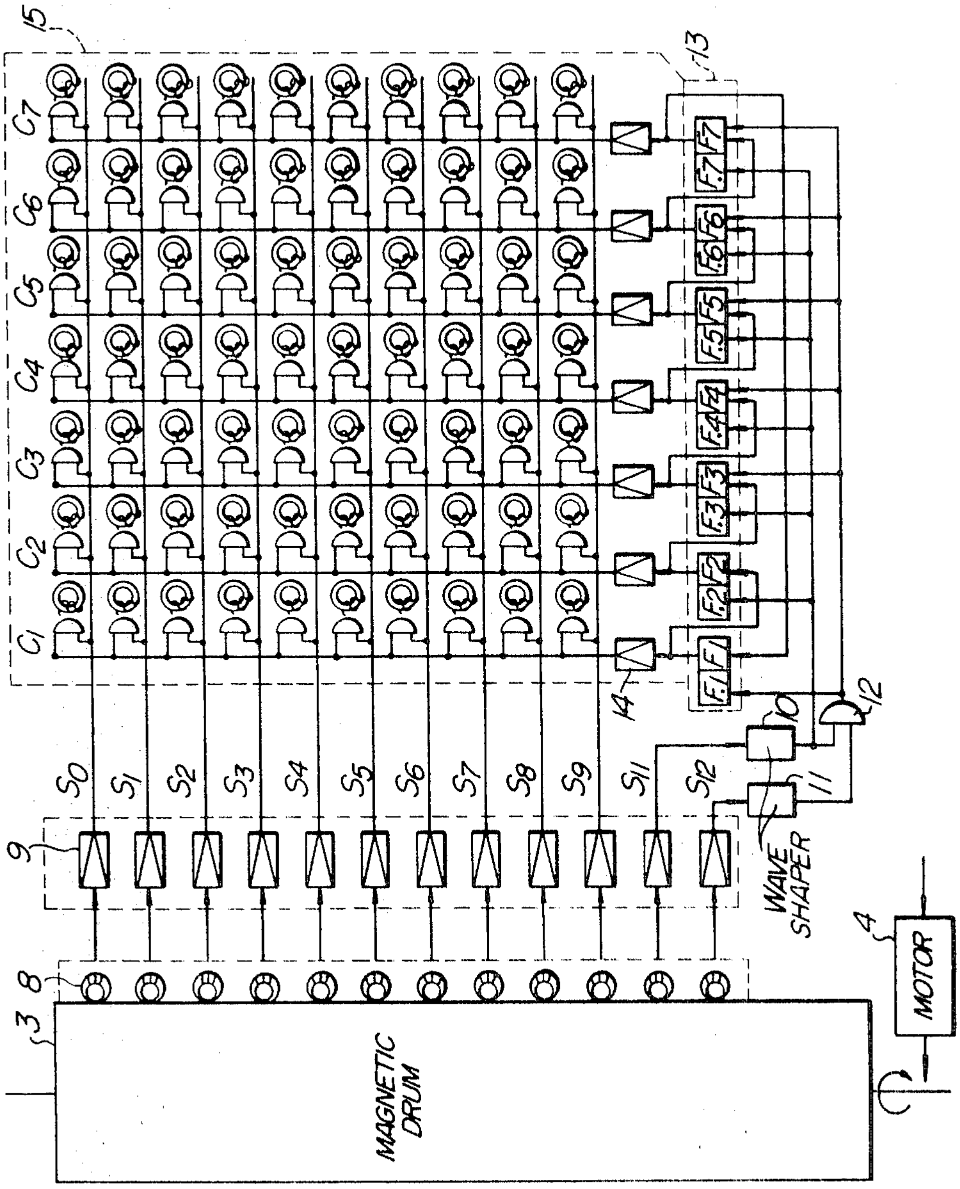
FIG. 2 is a block diagram illustrating the constitution of the principal part of the device according to the present invention.
Figure 3:
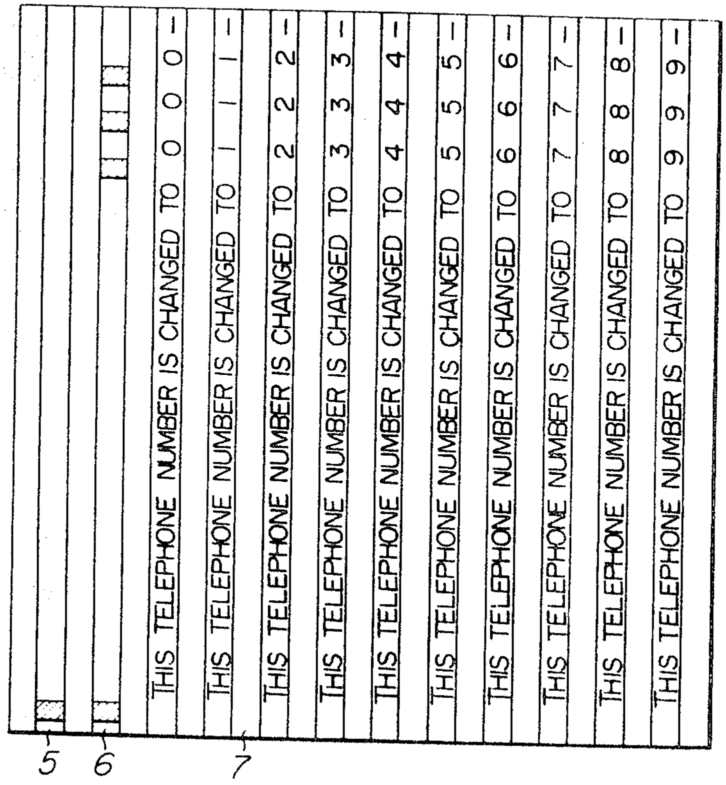
FIG. 3 is an illustrative view to show how the recording of vocal information is effected on the drum.
Figure 4:
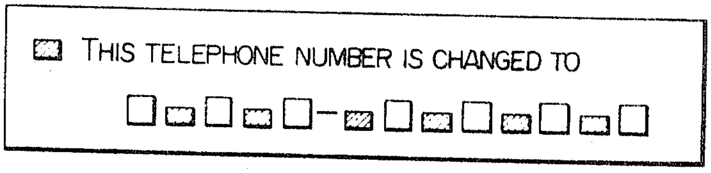
FIG. 4 is another illustrative view to show how the recording of vocal information is performed on a number signal track which is one of the tracks provided on the drum.

FIG. 2 is a block diagram illustrating the constitution of a number selection means, in which numeral 3 designates a magnetic drum driven by an electric motor to revolve at a constant rate. The magnetic drum 3 carries on its cylindrical surface a starting signal track 5, a synchronizing signal track 6 and a plurality of tracks corresponding to numbers 0 to 9 for recording vocal information of the changed numbers, each track running peripherally in parallel relationship with one another as shown in FIG. 3. The constitution of one of the number signal tracks corresponding to numbers 0 to 9 is shown in FIG. 4. The number signal track shown in FIG. 4 is provided with a plurality of square areas, within each of which one of numbers 1 to 0 is recorded in the form of vocal information. The shaded or hatched rectangular areas provided on the number signal track together with said squares indicate that there exist synchronizing signals at the corresponding positions in the synchronizing signal track. Further, the hatched rectangle located nearest to the left end of the track shown in FIG. 4 indicates that there exists a starting signal at the corresponding position in the starting signal track. Thus, the information to be reproduced as a vocal signal can be correctly transmitted through a magnetic head with the aid of a synchronizing signal associated with this said information. Therefore, an undesirable loss of vocal information is prevented (in other words, this will enable the synchronous signal to be prevented from providing wrong timing for the reproduction of the desired vocal information.).

In FIG. 2, numeral 8 generally indicates a plurality of magnetic heads adapted to read out the vocal information recorded on the magnetic drum 3, each head being located corresponding to each of the tracks, i.e. the starting signal track 5, the synchronizing signal track 6 and the number signal tracks. Numeral 9 indicates a set of amplifiers adapted to amplify the output signals from the associated magnetic heads. Numerals 10 and 11 designate wave shaping circuits which are provided for the purpose of shaping the waveforms respectively of the starting signal track 5 and the synchronizing signal track 6. Numeral 12 indicates an AND-circuit adapted to detect the coincidence between the outputs respectively from the wave shaping circuits 10 and 11. Numeral 13 identifies a ring counter comprising a plurality of cascade connected flip-flop circuits, which ring counter produces in succession a plurality of outputs at the successive flip-flops, the series of outputs delivered at the flip-flops being produced each time one of the successive signal outputs from the AND-circuit 12 reaches the ring counter. Numeral 14 generally shows a plurality of amplifiers adapted to amplify the outputs from the corresponding flip-flops constituting said ring counter 13. Numeral 15 covers a matrix circuit comprising a plurality of gating units adapted to detect the coincidence between the output respectively of the amplifiers 9 and 14 and the associated magnetic cores whose number is the same as that of said gating units. Reference characters $S_0$ to $S_{12}$ represent the outputs from the amplifiers designated at numeral 9, respectively. $C_1$ to $C_7$ are the output leads of the amplifiers designated at numeral 14, respectively.

Figure 5:
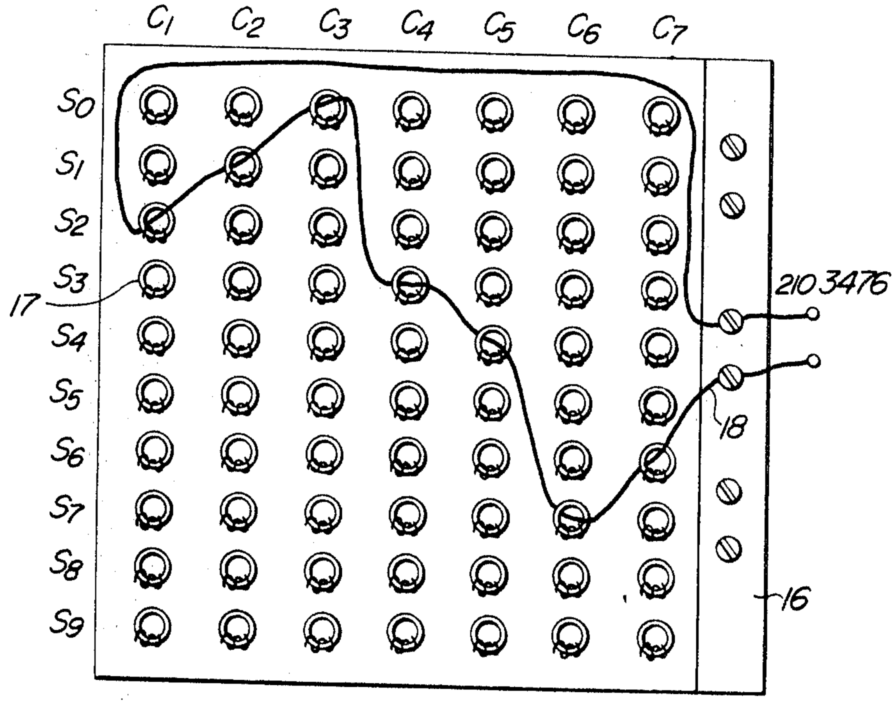
FIG. 5 is a plan viewed from above of the number selection means incorporated in the device according to the present invention.

FIG. 5 shows the above-mentioned number selection means comprising a coupling station 16 provided for the effective connection of said number selection means with its associated secondary equipment and magnetic cores indicated generally at 17 constituting said matrix circuit 15. Numeral 18 indicates a jumper wire which transmits the output from the matrix circuit to an amplifier 2 incorporated in said secondary equipment.

The explanation of the operation of the present device will now be given hereinafter. To begin with, numbers 0 to 9 are recorded on the number signal tracks on the drum 3, while the jumper wire 18 is so provided as to cause the magnetic heads to pick up the desired information stored on the corresponding tracks depending upon the changed number of the called subscriber.

FIG. 5 shows an example in which the newly allotted number corresponds to 210-3476. By connecting the jumper wire 18 with the terminals of a secondary equipment associated with the old number which has been replaced by another one, the newly allotted number can be selected in the matrix circuit 15 when a subscriber who had had his old number changed to another newly allotted one is called by another subscriber through the operation of the arrester springs, and finally the information of the subscriber allotted or changed number can be sent to the calling subscriber via the jumper wire 18 and the amplifier 2. Assume, for example, that some subscriber has had his telephone number "A", changed to 210–3476. In this case the jumper wire is so coupled magnetically to a set of the magnetic cores particularly selected for the information corresponding to "This telephone number is changed to 2", "1", "3", "4", "7", and "6" (that is, a set of magnetic cores which collect the combined outputs which are delivered from one of the amplifiers 9 and one of the amplifiers 14, in other words, a set of magnetic cores associated with a plurality of output pairs respectively identified by the corresponding combinations of $C_1$ and $S_2$, $C_2$ and $S_1$, $C_3$ and $S_3$, $C_4$ and $S_3$, $C_5$ and $S_4$, $C_6$ and $S_7$, and $C_7$ and $S_6$.) Thus, when a subscriber is calling the old number "A," the first stage of the ring counter is firstly set due to the calling signal at coincidence between the output from the starting signal track and the output from the synchronizing signal track, thereby to cause the cores lying along the column $C_1$ as seen in FIG. 5 to be grounded. Thence, the jumper wire 18 picks up the output $S_2$ from the amplifier adapted to amplify the signal of a particular number track containing this part of the information "This telephone number is changed to 2" and also transmits the part of the vocal information "This telephone number is changed to 2" from the drum to said secondary equipment and thereafter the information is conveyed through the telephone line to the calling subscriber. After this, when an output is delivered from the AND-circuit 12 as the drum rotates to cause the magnetic head located on the synchronizing signal track to reach the next synchronizing signal, the first stage of the ring counter 13 is reset and in turn the second stage of the ring counter 13 is set. In this phase (wherein an output is delivered at the output lead $C_2$), the output $S_1$ from a magnetic head located at a particular number signal track containing the information "1" is picked up by the jumper wire. Then, in like manner, the vocal information "1" is transmitted to the secondary equipment. After all, in the manner previously described, complete vocal information stating, "This telephone number is changed to 210–3476" is sent to the secondary equipment via the jumper wire 18. Therefore, the secondary equipment is to successively amplify each of the signals from a selected set of number signal tracks so that the calling subscriber receives vocal information stating that "This telephone number is changed to 210–3476."

In the above described embodiment, explanation is directed to a case where only one subscriber is concerned with the change of a telephone number. In case a plurality of changed numbers are required to be informed, the corresponding jumper wires are so provided that each of the jumper wires may be coupled to a set of selected magnetic cores corresponding to the changed number and the same number of secondary equipments which are respectively connected with the jumper wires are connected with their associated arrester springs. In fact, a number of jumper wires and pieces of secondary equipment corresponding to the plurality of changed numbers are needed.

As described above the device according to the present invention comprises at least one piece of secondary equipment connected with its associated arrester spring to be engaged with the line for the subscriber whose telephone number has been changed; one recording system having a plurality of number signal tracks in which the number 0 to 9 are recorded as local information, and which moves at a constant rate; a starting signal track and a synchronizing signal track; one ring counter adapted to be triggered sequentially by the successive synchronizing signals from the said synchronizing signal track; a plurality of magnetic cores arranged in the form of a matrix wherein vocal information signals are provided only for a set of magnetic cores connected commonly with one of the output leads at which the output from said ring counter is delivered; and one pickup wire or jumper wire which is magnetically coupled to a set of magnetic cores each of which is selected among the magnetic cores connected with some common output lead in accordance with the changed number to be informed and which wire is further connected with said secondary equipment. Moreover, the device according to the present invention enables a calling subscriber to be automatically informed of a newly allotted number for subscriber whom he wishes to communicate with. Furthermore, according to the present device, in case a subscriber has had his telephone number changed, a jumper wire has only to be associated with a set of magnetic cores selected depending upon the changed number so that the setting of a changed number is easily achieved. A plurality of jumper wires can also be provided in the matrix circuit so that only the addition of further jumper wires enables the device to operate for a plurality of changed numbers. Thus, there is the advantage that the same equipment used for a signal-changed number can still be utilized for a plurality of changed numbers.

Figure 6:
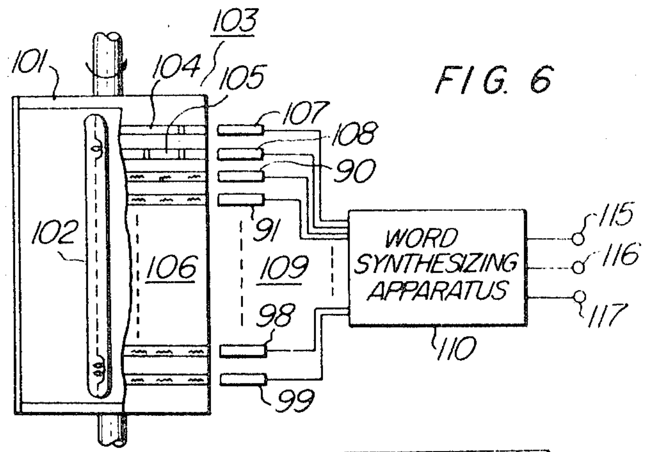
FIG. 6 is a systematic diagram illustrating a device as another embodiment of the present invention.
Figure 7:
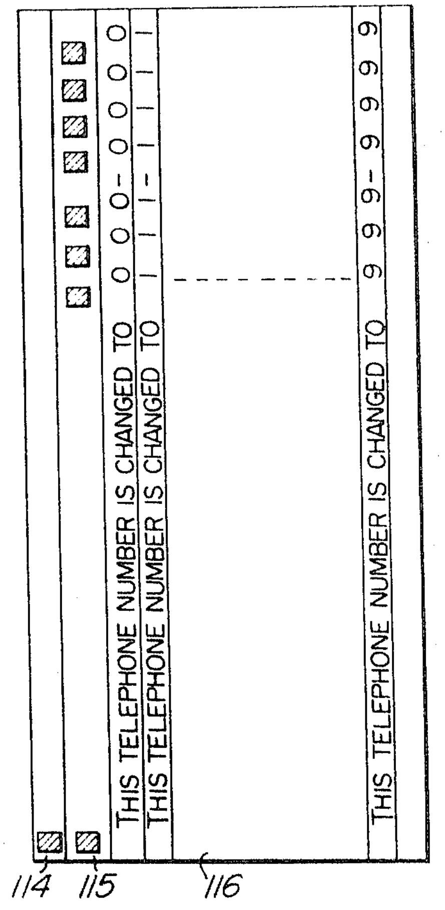
FIG. 7 and FIG. 8 are views illustrating the developments of the principal parts of the device shown in FIG. 6.
Figure 8:
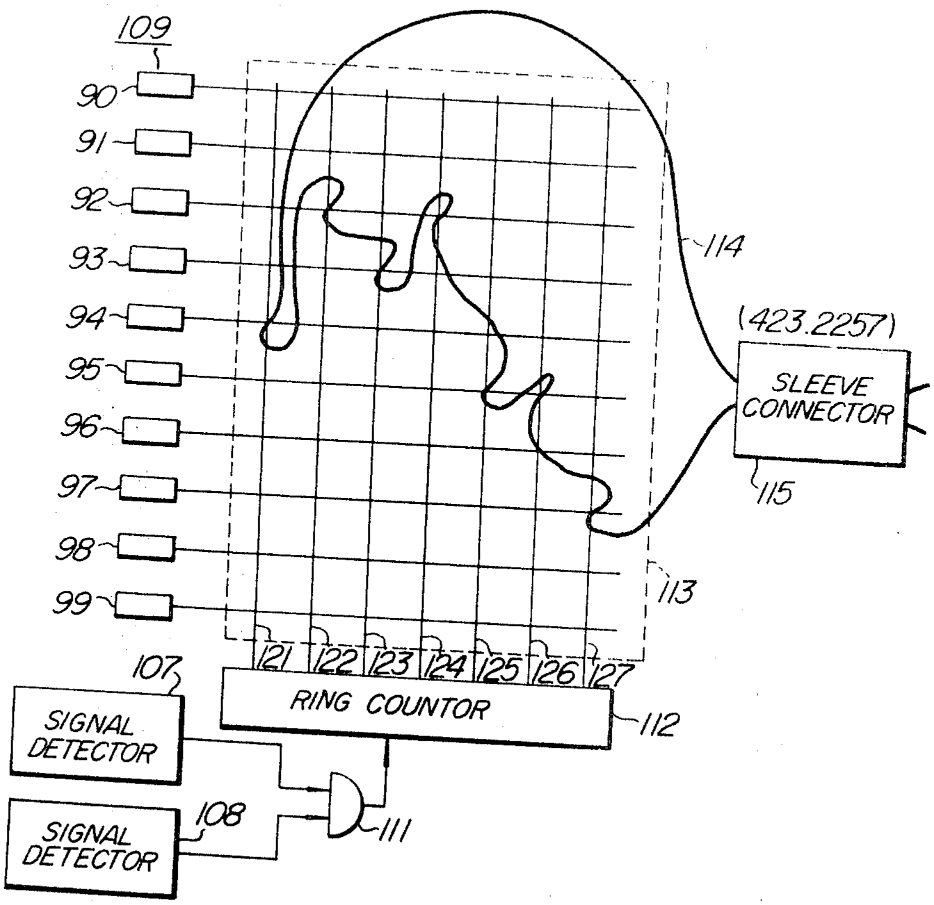

FIGS. 6 to 8 are concerned with an embodiment of the present invention wherein a plurality of changed numbers can be informed. In FIG. 6 numeral 101 designates a rotary drum which revolves in the direction indicated by an arrow. Numeral 102 indicates a light source located within the drum 101 and numeral 103 represents recording mediums formed, for example, of a strip of transparent film provided peripherally around the cylindrical surface of a drum, the recording mediums constitute a starting signal track 104, a synchronizing signal track 105 and a plurality of number signal tracks 106 each corresponding to one of numbers 0 to 9 (for example, the vocal information "that this telephone number is changed to 111–1111 is stored in the recording mediums so as to be reproduced in accordance with the intensity of light.) Numerals 107 and 108 indicate signal detectors adapted to detect the signals stored in said recording mediums, while numeral 109 (covering 90, 91, ........, 98, 99) designates a plurality of photosound detectors, all the signal detectors and the photosound detectors being provided near the cylindrical surface of the rotary drum 101 and securely fixed. The signal detectors 107 and 108 are located at and corresponding to the starting signal track and the synchronizing signal track. The photosound detectors 109 (90 to 99) are located respectively at the number tracks corresponding to numbers 0 to 9. Numeral 110 indicates a phrase synthesizing unit comprising, as shown in FIG. 8, an AND-circuit 111, a ring counter 112 sequentially driven stepwise by the successive outputs from the AND-circuit 111, and a core matrix circuit 113 constituted in the form of a matrix with the outputs (121 to 127) of the ring counter 112 and the outputs of the photosound detector 109 (90 to 99).

Assume, for example, that a subscriber has had his telephone number "A" changed to 423–2557 and a jumper wire 114 has only to be arranged as shown in FIG. 8. Numeral 115 indicates a coupling member or sleeve connector adapted to be connected with the pair of arrester springs corresponding to a subscriber whose telephone number is changed to another one in the associated telephone exchange so as to trip the line for the subscriber. The components represented by numerals 115, 116 and 117 in FIG. 6 correspond to a coupling member or sleeve connector designated in FIG. 8 at 115 wherein the output corresponding to a changed number to be informed can be delivered through the jumper wire 114.

The following description is directed to the operation of the device now in question. The signal detectors 107 and 108 and the photosound detectors 109 (90 to 99) are associated respectively with tracks of the recording mediums 103. Now, if the rotary drum 101 is rotated in the direction indicated by an arrow as seen in FIG. 6, the signal detectors 107 and 108 and the photosound detectors will deliver their associated outputs in accordance with the intensity of light transmitted through the recording medium 103. A starting signal output from the starting signal track 107 and a syncrhonizing signal output from the synchronizing signal track 108 are applied together to an AND-circuit so as to effect the stepwise operation of the ring counter 112. According to this stepwise operation, output signals will appear respectively at the output terminals 121 to 127 of the ring counter 112. Now, for example, assume a case where a subscriber A has had his telephone number changed to 423-2557. By so arranging the jumper wire 114 as seen in FIG. 8 as to be associated with the set of cores in the matrix circuit 113 which correspond to the number 423-2557, and connecting the coupling member 115 to which the output ends of the jumper wire are coupled with an appropriate pairs of arrester springs, a subscriber calling the subscriber "A" can be informed of the statement through the arrester springs that "This telephone number is changed to 423-2557 when the subscriber is calling subscriber A.

In the device described above, a starting signal, a synchronizing signal and number signals corresponding to numbers 0 to 9 are derived from the rotary drum 101 so that any desired composite signal is obtained through the number selection operation of the phrase synthesizer. The recording medium to store the starting signal, the synchronizing signal and the number signals covering the numbers 0 to 9 may be formed with, for example, a transparent film. And therefore, a series of outputs can be obtained in accordance with the intensities of a plurality of light signals which are transmitted through a plurality of signal tracks. So, in this device, the adjustment of the position of the detectors to be used will be easily performed. In the above, description has been made of the device according to the present invention which is used as a device for informing a calling subscriber of the number newly allotted to the previous number. However, by storing different codes in the number signal tracks and through the selective operation of the synthesizer this device can also be used as an announcing machine for providing a number of different outputs simultaneously.

I claim:

1. An automatic telephone information device, comprising secondary equipment having means connected with the line of a subscriber whose telephone number is changed, said means rectifying the ringing signal from an exchange to send the rectified signal as a line connection signal for a calling subscriber back to said exchange and signalling said calling subscriber; a recording means rotatable at a constant speed, having control signal tracks and number signal tracks in which the numbers 0 to 9 are recorded respectively as a plurality of vocal announcements; a ring counter triggered sequentially by successive signals delivered from said control signal tracks; a magnetic core matrix coupled to said recording means, means applying matrix vocal information signals corresponding to 0 to 9 only to a set of cores connected commonly with one of the outputs of said ring counter, which output delivers an output signal; and a detecting wire operatively connected with said secondary equipment and magnetically coupled to a group of cores, each core being selected according to a changed telephone number among each set of cores commonly connected with one of the outputs of said ring counter.

2. A device according to claim 1, wherein said secondary equipment is connected with a called subscriber's line.

3. A device according to claim 1, wherein the numbers of said recording means and said group of cores are both independent of the increase in the number of changed telephone numbers and wherein the numbers of secondary equipment and detecting wires are equal to the number of changed telephone numbers.

4. A device according to claim 1, wherein said recording means comprises a magnetic drum and detector means to detect their respective information from said drum.

5. A device according to claim 1, wherein said recording means comprises a rotary drum wherein said control signal tracks and number signal tracks are formed on a transparent substrate provided peripherally on the drum surface; a light source for producing at least one light spot at a portion of each of said control signal tracks and said number tracks; and a plurality of photoconductive transducer means to detect the information stored on the drum.